United States Patent [19]

Kovanda et al.

[11] 4,147,657
[45] Apr. 3, 1979

[54] MIXING REACTIVE LIQUIDS AND PREPARING COAGULANT AIDS

[75] Inventors: Robert J. Kovanda, Westmont, Ill.; Serge Maliar, Jr., Holmes; Robert W. Spencer, Wallingford, both of Pa.

[73] Assignee: PQ Corporation, Valley Forge, Pa.

[21] Appl. No.: 821,372

[22] Filed: Aug. 3, 1977

Related U.S. Application Data

[63] Continuation-in-part of Ser. No. 748,347, Dec. 7, 1976, abandoned.

[51] Int. Cl.² .............................................. B01J 13/00
[52] U.S. Cl. ................................. 252/313 S; 252/317; 252/359 A; 252/359 D; 422/232
[58] Field of Search ............... 252/313 S, 317, 359 A, 252/359 D; 23/252 R, 283, 285

[56] References Cited

U.S. PATENT DOCUMENTS

| 3,072,464 | 1/1963 | Akaboshi et al. | 23/285 X |
| 3,615,253 | 10/1971 | Warzel | 23/285 X |
| 3,963,640 | 6/1976 | Smith | 252/313 R |
| 4,016,097 | 4/1977 | Smith | 252/313 S |

FOREIGN PATENT DOCUMENTS

2151206  4/1973  Fed. Rep. of Germany ...... 252/359 D

*Primary Examiner*—Richard E. Schafer
*Assistant Examiner*—E. Suzanne Parr
*Attorney, Agent, or Firm*—Ernest G. Posner; Fred C. Philpitt; J. Stephen Bobb

[57] ABSTRACT

An apparatus and process for the preparation of colloidal dispersions of sodium metallo silicates, useful as coagulant aids, are disclosed. The dispersions are prepared by the controlled sequential mixing of separate streams of water, sodium silicate and a metal salt in a mixing block that has no moving parts. The apparatus and process are also useful in the mixing of other reactive solutions and fluids.

22 Claims, 1 Drawing Figure

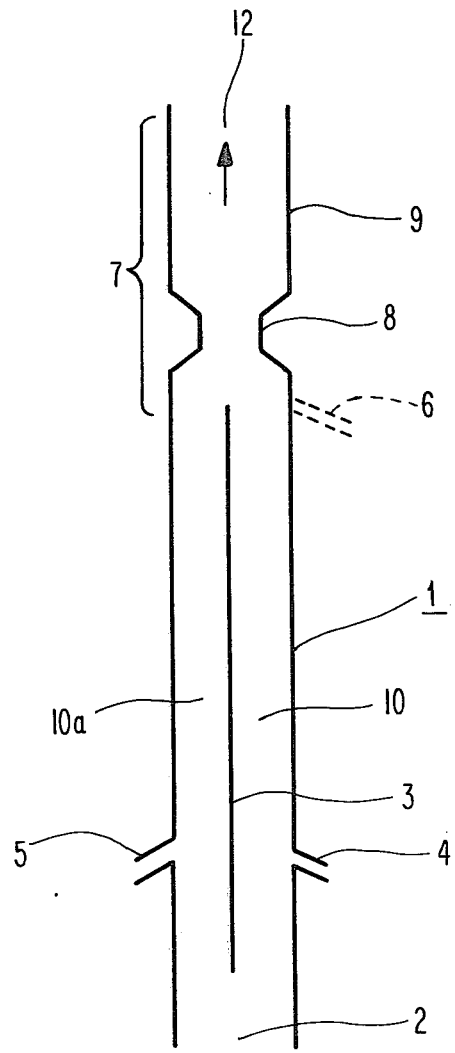

MIXING REACTIVE LIQUIDS AND PREPARING COAGULANT AIDS

BACKGROUND OF THE INVENTION

This invention relates to mixing reactive liquids and to the preparation of sodium metallo silicates that are useful as coagulant aids in water treatment. The particular characteristics of the apparatus and process are such that said active silicate dispersions can be prepared without the use of high shear in a mixing block having no moving parts.

Preparation of a sodium alumino silicate dispersion useful as a coagulant aid is disclosed in U.S. Pat. No. 3,963,640 to Smith. This patent teaches that the complex can only be made by subjecting sodium silicate, alum, and water to high shear mixing. Smith further teaches that gels and not dispersions are formed when the reactants are mixed with less shear than that developed by his carefully defined apparatus.

It is an object of the present invention to provide sodium metallo silicate dispersions without the need for high shear mixing by using a mixing block with no moving parts. It is a further object of this invention to provide apparatus and a process for mixing reactive liquids at low shear in a device with no moving parts.

BRIEF DESCRIPTION OF THE DRAWING

The drawing is a plan view of the mixing block showing how the reactant streams enter the block and are sequentially mixed to form the dispersion which exits the block to the water treatment facility. The drawing shows a single embodiment of the mixing means of our invention showing only one partition and two separate chambers. Additional partitions and inlets can also be employed to enable the addition, dilution and mixing of more than two reactive ingredients.

SUMMARY OF THE INVENTION

We have invented a process and apparatus whereby active sodium metallo silicate dispersions, such as sodium alumino silicate, can be prepared in a mixing block that has no moving parts and does not develop high shear. The process does not require the instantaneous mixing of all components. The process comprises the steps of:

(a) providing a mixing block, comprising:
(1) a chamber or tube formed by boring a hole in a solid block, the initial portion of which is partitioned to form separate chambers through which fluids can flow;
(2) an inlet for introducing fluid into the chamber so that the fluid flows through said mixing block and said separate chambers;
(3) inlets formed by boring holes in said block intersecting said separate chambers;
(4) a mixing area formed by that portion of the chamber subsequent to the partitioned area having a constriction of said chamber; and
(5) an outlet from the block;
(b) providing a flow of water to said mixing block so that two streams of water are formed, flowing in said separate chambers;
(c) injecting sodium silicate solution into one of said inlets, thereby forming a flowing stream of dilute silicate in one of said separate chambers;
(d) injecting of a metal salt solution into another of said inlets, thereby forming a flowing stream of dilute metal salt solution in the other separate chamber;
(e) mixing the streams of dilute metal salt solution and dilute sodium silicate solution by allowing them to flow into said mixing area, and
(f) recovering the sodium metallo silicate dispersion from the outlet.

The apparatus and process of this invention can be used to mix and react numerous materials in addition to those discussed in this specification. The process and apparatus is especially well suited to those materials that react quickly or are subjected to localized gelling without proper dilution prior to mixing.

In addition, the drawing and specification are largely drawn to an apparatus and process for mixing two reactive ingredients; it will be recognized that this apparatus and process is equally well suited to mixing of reactive ingredients in excess of two, by simply adding more partitions and thereby forming additional separate chambers.

THE INVENTION

The apparatus and process of our invention is effective in mixing any liquid materials that react readily and require thorough dilution to achieve the desired results. The preparation of uniform silica gels by the controlled sequential dilution and mixing of a silicate solution and an acid is easily achieved. The preparation of varioles organic polymers which set in some finite time after mixing is also facilitated by our apparatus and process.

Although sodium, potassium or lithium silicate solutions can be used in the main embodiment of our invention, we prefer to use sodium silicates. In general, any sodium silicate can be used, but we prefer silicates having 2.5 to 4.5 moles of $SiO_2$ per mole of $Na_2O$ and silicates with 3.0 to 4.0 moles of $SiO_2$ per mole of $Na_2O$ are most preferred. The solutions should contain 25 to 45% silicate solids before dilution.

Any salt that is a source of ferric or aluminum ions is useful in the process of our invention. Such salts include among others, ferric chloride, ferric sulfate, ferric nitrate, aluminum chloride, aluminum sulfate (alum) and aluminum nitrate. Alum is preferred as a source of aluminum ions and is supplied at the mixing block inlet as a solution containing 30 to 60% $Al_2(SO_4)_3 \cdot 14 H_2O$. We prefer to use 45 to 55% solution.

The remainder of this disclosure and the examples are limited to the use of alum and the production of sodium alumino silicate. This limitation is imposed strictly to simplify the discussion and no limitation of our process or apparatus other than those defined in our claims is implied.

The components, water, alum, solution and sodium silicate solution are combined in the mixing means shown in the drawing. The mixer can be constructed of any material that is compatible with the raw materials and the final product; we prefer to form the device by machining or molding a block of plastic. The outline of the block is not shown in the drawing. The mixer consists of chamber 1 formed by creating a cylindrical hole in the block, most commonly accomplished simply by drilling the hole. Water enters the block through inlet 2 and is split into 2 flowing streams by partition 3 which separates the initial portion of chamber 1 into chambers 10 and 10a. Inlets 4 and 5 are used to introduce alum solution and sodium silicate solution into the separate chambers thereby forming flowing streams of dilute alum and sodium silicate solutions. These streams flow separately into the mixing area 7 which begins at the end of the partition. Turbulent flow and complete mixing are achieved when the streams combine and flow through constriction 8 and into area 9 which has the same diameter as chamber 1. The product formed is removed by outlet 12.

The sodium alumino silicate complex formed is completely dispersible in HCl and any gel that might be formed on the interior of the mixing block can be removed by flushing with hydrochloric acid. The acid can be interjected through inlet 6. The acid can also be injected through inlet 4 or 5 while eliminating inlet 6. The inlet used to inject alum is used for acid addition.

The diameter of the bore forming the mixing device can be varied widely and depends on the flow of water required to carry the raw materials and product through the mixer especially if it is mounted vertically with the flows directed upwards. Flows of 0.2 to 7.65 gallons of water per minute require bore diameters of 0.250 to 1.50 inches.

Partition 3 must be of sufficient length to ensure uniform and complete mixing of the alum solution and silicate solution with the water stream. The length of the partition should be 50 to 80% of the mixing block which should be between 10 and 24 inches. Therefore, the partition can be between 5 and 21 inches long. Some situations may require a longer mixing block.

The mixing area 7 constitutes the remainder of the mixing block or about 2 to 12 inches. The diameter of the constriction 8 must be sufficiently smaller than that of the remainder of the mixing chamber to provide turbulent flow. The diameter of the constriction should be about 0.025 to 0.75 inches or about 10 to 50% of the diameter of chamber 1. The partition 3 can form chambers 10 and 10a so that they have equal volume, thereby maintaining equivalent water flows in both chambers. The partition can also create chambers of unequal volume so that either chamber can have 30 to 70% of the flow of water through the block.

The alum and sodium silicate solutions are delivered to the mixing block by appropriate pumps and are selected so that the sodium alumino silicate product contains 0.5 to 3% silica and a sufficient amount of $Al_2(SO_4)_3 \cdot 14\ H_2O$ to provide a pH of about 4.5 to 6.0. A preferred concentration range for the product is 0.5 to 2.0% silica and $Al_2(SO_4)_3 \cdot 14\ H_2O$ while our most preferred range is 0.5 to 1% $SiO_2$ and $Al_2(SO_4)_3 \cdot 14\ H_2O$.

The product is useful as a coagulant aid, interacting with primary coagulants such as alum or ferric chloride to precipitate suspended solids.

EXAMPLES

The following examples illustrate preferred embodiments of our invention. The examples are not considered to restrict the scope of our invention to the conditions shown therein. The scope of our invention is fully defined in the claims and specifications.

EXAMPLE 1

A laboratory simulation of a commercial installation of the mixing block of our invention was carried out. The block used was 15″ in length, the bore or chamber diameter was 1″ and the diameter of the constricted portions of the chamber was ¼″. The silicate and alum feed lines were ½″ which constricted to ¼″ before entering the mixing block. The partition extended 8″ into the block. The sodium silicate had a concentration of 37.5% by weight of silicate solids and a mole ratio of 3.3 $SiO_2/Na_2O$. The alum had a concentration of 50% $Al_2SO_4 \cdot 14\ H_2O$. The silicate was pumped into the block at a rate of 6.5 gallons per hour (gph) while the rate for the alum was 3.75 gph. The flow of the dilution water through the block was 4.2 gallons per minute. These rates provided about 1% $SiO_2$ in the final product as determined by chemical analysis. The block was flushed with 350 ml/min of commercial concentrated HCl for 1.5 minutes every 2 hours.

The mixing block worked well and formed the desired alumino-silicate complex. There was no notable gel build-up, especially when the acid flush was accomplished.

The activity of the resultant coagulant aid was tested as follows. Two samples of the reaction product were taken at 3 hour intervals and tested using the jar test method. This procedure is described in TAPPI Monograph #18, Chapter V. The primary coagulant, alum, was added at 25 ppm while the coagulant aids were added at 3 ppm. The test water was a suspension of fine kaoline clay. The jar test conditions were: fast mixing (100 rpm) during addition and for 3 minutes thereafter, followed by 5 minutes slow stirring (20 rpm) and 1 minute settling before samples for turbidity measurements were taken. The samples were taken 1″ below the surface.

A Klett-Summerson Photoelectric Colorimeter was used to measure turbidities using a 40 mm cel depth, a blue filter and deionized water as a standard with a reading of zero. The Klett-Summerson values were converted to Jackson Turbidity Units (JTU) using a correlation curve based on the Formazin Turbidity Standard.

A prior art coagulant aid containing sodium silicate and ammonium sulfate was used as a comparison in this test. The results are summarized in the following table:

| Coagulant Aid & Dosage (ppm of $SiO_2$) | Coagulant & Dosage (ppm) | Floc Size | Turbidity (JTU) |
|---|---|---|---|
| None | Alum 25 | Fine to small | 17 |
| Prior Art 3 | Alum 25 | Small to medium | 5 |
| Invention 3 | Alum 25 | Medium | 3.5 |

These results show the effectiveness and consistent activity of the coagulant aid made in the block of our invention.

EXAMPLE 2

A trial of our mixing block and process was carried out at a plant having a low daily throughput, but a high and difficult to flocculate solids content. The suspended solids included paper and mineral fibers, expanded inorganics, clays and starch. These solids are difficult to remove because of the protective colloid activity of the starch. The mixing block and reagents were the same as in Example 1.

The feed rates to the unit were:

| Dilution Water | 2 gallons/minute |
|---|---|
| Sodium Silicate | 74.4 gallons/day |
| Alum | 41.7 gallons/day |

These rates produced a product containing 1% $SiO_2$ as determined by analysis. This product and alum were dosed to the effluent water separately at 250 ppm $SiO_2$ and 700 ppm respectively. Improved flocculations were obvious in the clarifier, and after an appropriate time, samples of reclaim water were noticeably improved. The reclaim water is taken from the clarifier at a point 6 to 7" below the normal water level.

Jar tests were also carried out as described previously using the heavily laden effluent water.

| Treatment (Dosages ppm) | | |
| --- | --- | --- |
| Alum | $SiO_2$ | Results |
| None | None | No flocculation |
| 600 | | No flocculation, turbid supernatant |
| 600 | 200 | Good flocculation, clear supernatant |
| 700 | 300 | Good flocculation, very clear supernatant |

We claim:

1. A process for preparing sodium metallo silicate dispersions useful as coagulant aids, comprising the steps of:
    (a) providing a mixing block, comprising:
        (1) a cylindrical chamber formed in a solid block, the initial portion of said chamber is partitioned to form separate chambers through which fluids can flow;
        (2) an inlet for introducing fluid into the mixing block so that it flows through both of said separate chambers and said cylindrical chamber;
        (3) inlets formed in said solid block intersecting said separate chambers;
        (4) a mixing area formed by that portion of the chamber subsequent to the separate chambers, a constriction of said chamber and a subsequent chamber of full diameter; and
        (5) an outlet from the block subsequent to the mixing area;
    (b) providing flow of water through said mixing block utilizing the inlet of (a) (2) above, whereby flowing streams are formed in said separate chambers;
    (c) injecting sodium silicate into one of said inlets intersecting one of said separate chambers, forming a flowing stream of dilute silicate in one of said separate chambers;
    (d) injecting a metal salt solution into said second inlet intersecting the other of said separate chambers, thereby forming a flowing stream of dilute metal salt solution in a second separate chamber;
    (e) mixing the streams of dilute metal salt and dilute sodium silicate by allowing them to flow into said mixing area; and
    (f) recovering the desired sodium metallo silicate dispersion from the outlet.

2. The process of claim 1 wherein the flow of water through the mixing block is 0.2 to 7.65 gallons per minute and the diameter is 0.250 to 1.50 inches.

3. The process of claim 1 wherein the metal salt is selected from the group consisting of ferric chloride, ferric sulfate, ferric nitrate, aluminum chloride, aluminum sulfate (alum) and aluminum nitrate.

4. The process of claim 3 wherein the metal salt is alum and the solution injected into said chamber has a concentration of 30 to 60% $Al_2(SO_4)_3 \cdot 14\ H_2O$.

5. The process of claim 4 wherein the alum has a concentration of 45 to 55% $Al_2(SO_4)_3 \cdot 14\ H_2O$.

6. The process of claim 1 wherein the sodium silicate has a concentration of 25 to 45% silicate solids and 2.5 to 4.5 moles of $SiO_2$ per mole of $Na_2O$.

7. The process of claim 6 wherein the silicate has 3.0 to 4.0 moles of $SiO_2$ per mole of $Na_2O$.

8. A process for preparing a sodium alumino silicate dispersion useful as a coagulant aid, comprising the steps of:
    (a) providing a mixing block, comprising:
        (1) a cylindrical chamber formed in a solid block, said chamber being 10 to 24 inches in length with a diameter of 0.250 to 1.50 inches;
        (2) a partition separating the initial portion of said chamber into two separate chambers through which fluids can flow, said partitions being 5 to 21 inches in length;
        (3) an inlet for introducing fluid into the mixing block so that it flows through both said separate chambers and said cylindrical chamber;
        (4) inlets formed in said solid block intersecting said separate chambers;
        (5) a mixing area formed by that portion of the chamber subsequent to the separate chambers, a constriction of said chamber, being 0.025 to 0.75 inches in diameter and a subsequent chamber 0.250 to 1.50 inches in diameter; and
        (6) an outlet from the block subsequent to the mixing area;
    (b) providing a flow of water through said mixing block utilizing the inlet of (a) (2) above, whereby flowing streams are formed in said separate chambers, the flow of water being 0.2 to 7.65 gallons per minute;
    (c) injecting a sodium silicate solution with 2.5 to 4.5 moles of $SiO_2$ per mole of $Na_2O$ and containing 25 to 45% silicate solids into one of said inlets, intersecting one of said separate chambers, forming a flowing stream of dilute silicate in one of said separate chambers, the rate of said silicate solution injection being sufficient to provide a concentration 0.5 to 3.0% $SiO_2$ in the sodium alumino silicate dispersion;
    (d) injecting alum solution containing 30 to 60% $Al_2(SO_4)_3 \cdot 14\ H_2O$ into said second inlet intersecting the other of said separate chambers, thereby forming a flowing stream of dilute alum solution in a second separate chamber, the rate of said alum injection being sufficient to provide 0.5 to 3% $Al_2(SO_4)_3 \cdot 14\ H_2O$ in the sodium alumino silicate dispersion;
    (e) mixing the streams of dilute alum and dilute sodium silicate by allowing them to flow into said mixing area; and
    (f) recovering the desired sodium alumino silicate dispersion.

9. The process of claim 8 wherein the sodium silicate has 3.0 to 4.0 moles of $SiO_2$ per mole of $Na_2O$.

10. The process of claim 8 wherein the concentration of the alum solution is 45 to 55%.

11. The process of claim 8 wherein sufficient sodium silicate solution and alum solution are injected to provide 0.5 to 2.0% $SiO_2$ and 0.5 to 2.0% $Al_2(SO_4)_3 \cdot 14\ H_2O$ in the sodium alumino silicate dispersion.

12. The process of claim 8 wherein sufficient sodium silicate solution and alum solution are injected to provide 0.5 to 1% $SiO_2$ and 0.5 to 1.0% $Al_2(SO_4)_3 \cdot 14 H_2O$ in the sodium alumino silicate dispersions.

13. A mixing block for preparing a coagulant aid, comprising:
   (a) a cylindrical chamber formed in a solid block, said chamber being 10 to 24 inches in length and 0.250 to 1.50 inches in diameter;
   (b) a partition positioned in the initial part of said cylindrical chamber dividing said chamber into two separate chambers, said partition being 5 to 21 inches in length;
   (c) an inlet for introducing fluid into the mixing block so that it flows through both of the separate chambers and said cylindrical chamber;
   (d) inlets formed in said solid block intersecting said separate chambers;
   (e) a mixing area formed of that portion of the cylindrical chamber subsequent to the partitioned area, a constriction of said chamber being 0.025 to 0.75 inches in diameter and a subsequent chamber 0.25 to 1.50 inches in diameter; and
   (f) an outlet from the block subsequent to the mixing area.

14. A process for mixing reactive fluids, comprising the steps of:
   (a) providing a mixing means, comprising:
      (1) a chamber, the initial portion of said chamber being partitioned to form separate chambers through which liquids can flow;
      (2) an inlet for introducing a fluid into the mixing means so that it flows through said separate chambers;
      (3) inlets intersecting said separate chambers;
      (4) a mixing area formed by that portion of the chamber subsequent to the separate chambers, a constriction of said chamber and the chamber area subsequent to said constriction; and
      (5) an outlet subsequent to said mixing area;
   (b) providing a flow of liquid through said mixing means utilizing the inlet of (a) (2) above, whereby flowing streams are formed in said separate chambers;
   (c) injecting a reactive fluid into the inlets intersecting said separate chambers forming separate flowing streams of said reactive fluids diluted with the fluid of step (b);
   (d) mixing the streams of dilute reactive ingredients by allowing them to flow into said mixing area; and
   (e) recovering the product of the mixed diluted reaction fluids.

15. The process of claim 14 wherein the length of the partitioned area is 50 to 80% of the total length of the mixing means.

16. The process of claim 15 wherein there are 2 separate chambers.

17. The process of claim 16 wherein the fluid flow provided at the inlet of (a) (2) is water and the reactive fluids are sodium silicate solution and a metal salt solution.

18. The process of claim 17 wherein the metal salt solution is selected from the group consisting of ferric chloride, ferric sulfate, ferric nitrate, aluminum chloride, aluminum sulfate (alum) and aluminum nitrate.

19. The process of claim 17 wherein the metal salt is alum.

20. The process of claim 17 wherein the sodium silicate has 2.5 to 4.5 moles of $SiO_2$ per mole of $Na_2O$.

21. The process of claim 20 wherein the sodium silicate has 3.0 to 4.0 moles of $SiO_2$ per mole of $Na_2O$.

22. A mixing means for reactive fluids, comprising:
   (a) a chamber, the initial portion of said chamber being partitioned to form separate chambers;
   (b) an inlet for introducing a fluid into the mixing means so that it flows through said separate chambers;
   (c) inlets intersecting said separate chambers;
   (d) a mixing area formed by that portion of the chamber subsequent to the separate chambers, a constriction of said chamber and the chamber area subsequent to said constriction; and
   (e) an outlet subsequent to said mixing area.

* * * * *